(12) United States Patent
Ikeda et al.

(10) Patent No.: US 9,822,272 B2
(45) Date of Patent: Nov. 21, 2017

(54) PRINTING INK COMPOSITION

(71) Applicant: Seiko Epson Corporation, Tokyo (JP)

(72) Inventors: Yasunari Ikeda, Shiojiri (JP); Akio Ito, Matsumoto (JP)

(73) Assignee: Seiko Epson Corporation (JP)

( * ) Notice: Subject to any disclaimer, the term of this patent is extended or adjusted under 35 U.S.C. 154(b) by 9 days.

(21) Appl. No.: 14/854,437

(22) Filed: Sep. 15, 2015

(65) Prior Publication Data

US 2016/0075896 A1   Mar. 17, 2016

(30) Foreign Application Priority Data

Sep. 16, 2014   (JP) .................................. 2014-187766

(51) Int. Cl.
| | | |
|---|---|---|
| C09D 11/328 | (2014.01) | |
| C09D 11/38 | (2014.01) | |
| C08K 5/42 | (2006.01) | |
| C08K 5/3492 | (2006.01) | |
| C08K 5/23 | (2006.01) | |
| C08K 5/3437 | (2006.01) | |
| C09B 67/22 | (2006.01) | |

(52) U.S. Cl.
CPC ................ C09D 11/38 (2013.01); C08K 5/23 (2013.01); C08K 5/3437 (2013.01); C08K 5/3492 (2013.01); C08K 5/42 (2013.01); C09B 67/0033 (2013.01); C09D 11/328 (2013.01)

(58) Field of Classification Search
CPC .............................. C09D 11/328; C09D 11/38
See application file for complete search history.

(56) References Cited

U.S. PATENT DOCUMENTS

| | | | |
|---|---|---|---|
| 4,689,078 A | 8/1987 | Koike et al. | |
| 2002/0144626 A1* | 10/2002 | Schut | ..................... C09D 11/32 106/31.58 |
| 2007/0107626 A1 | 5/2007 | Chevli | |
| 2009/0021568 A1* | 1/2009 | Xu | ..................... C09B 67/0008 347/96 |
| 2015/0130881 A1* | 5/2015 | Oguchi | .................. C09D 11/40 347/103 |

FOREIGN PATENT DOCUMENTS

| | | |
|---|---|---|
| EP | 0202656 A2 | 11/1986 |
| EP | 1010802 A2 | 6/2000 |
| JP | 5006684 B2 | 8/2012 |

OTHER PUBLICATIONS

Extended European Search Report for Application No. EP 15 18 3933 dated Feb. 10, 2016 (6 pages).
Extended European Search Report for Application No. EP 15 18 3936 dated Feb. 10, 2016 (6 pages).

* cited by examiner

*Primary Examiner* — Veronica F Faison
(74) *Attorney, Agent, or Firm* — Harness, Dickey & Pierce, P.L.C.

(57) ABSTRACT

A printing ink composition includes a disperse dye, a first solvent, a water soluble dye, and a dispersant, in which an IOB value A of the disperse dye, an IOB value B1 of the first solvent, and an IOB value C of the water soluble dye satisfy the following Equation (1), A<B1<C (1), the IOB value B1 is 1.0 to 4.0, and a content of the first solvent exceeds 5.0 mass %.

7 Claims, No Drawings

PRINTING INK COMPOSITION

BACKGROUND

1. Technical Field

The present invention relates to a textile printing ink composition.

2. Related Art

An ink jet recording method is a method which can record a high definition image with a relatively simple apparatus, and it has been rapidly developed in various aspects. Among the aspects, study on the dispersion stability of a color material, or the like has been performed in various ways. For example, for the purpose of providing an ink having excellent stability, Japanese Patent No. 5,006,684 discloses an ink for ink jet including one or two or more types of a disperse dye, one or two or more types of a water soluble dye, and one or two or more types of a dispersant, in which a difference between an inorganic/organic value of the dispersant and an inorganic/organic value of the disperse dye is 0 to 1, and a difference between an inorganic/organic value of the dispersant and an inorganic/organic value of the water soluble dye is 2 or more.

However, the ink composition disclosed in Japanese Patent No. 5,006,684 has a problem that ink filterability, intermittent printing stability, and continuous printing stability are degraded.

SUMMARY

An advantage of some aspects of the invention is to provide a textile printing ink composition having excellent ink filterability, intermittent printing stability, and continuous printing stability.

The inventors studied thoroughly in order to solve the above mentioned problems. As a result, the inventors found out that the ink composition having a predetermined component relationship can solve the above mentioned problems, and completed the invention.

Specifically, the invention is described as follows.

[1] A printing ink composition including: a disperse dye; a first solvent; a water soluble dye; and a dispersant, and in which an IOB value A of the disperse dye, an IOB value B1 of the first solvent, and an IOB value C of the water soluble dye satisfy the following Equation (1), $A<B1<C$ (1), the IOB value B1 is 1.0 to 4.0, and a content of the first solvent exceeds 5.0 mass %.

[2] In the printing ink composition according to [1], the first solvent includes at least one selected from a group consisting of triethylene glycol, 1,4-butanediol, 1,5-heptanediol, 3-methyl-1,5-heptanediol, 1,2-hexanediol, 1,6-hexanediol, triethylene glycol monobutyl ether, and 2-pyrrolidone.

[3] In the printing ink composition according to [1] or [2], a content of the first solvent is 10 mass % to 30 mass %.

[4] The printing ink composition according to any one of [1] to [3], further includes a second solvent, and an IOB value B2 of the second solvent is 5.0 or more.

[5] In the printing ink composition according to [4], a content of the second solvent is 3.0 mass % to 10 mass %.

[6] In the printing ink composition according to any one of [1] to [5], the dispersant includes at least any one of a formalin condensate of a lignin sulfonic acid and a formalin condensate of a naphthalene sulfonic acid compound.

[7] In the printing ink composition according to any one of [1] to [6], the IOB value C is 4.0 to 6.0.

[8] In the printing ink composition according to any one of [1] to [7], the IOB value A is 0.80 to 1.5.

DESCRIPTION OF EXEMPLARY EMBODIMENTS

Hereinafter, an embodiment of the invention (hereinafter, referred to as "the embodiment") is described in detail. However, the invention is not limited thereto, and various modifications can be made within the scope not departing from the gist of the invention.

Printing Ink Composition

A printing ink composition of the embodiment includes a disperse dye, a first solvent, a water soluble dye, and a dispersant. An IOB value A of the disperse dye, an IOB value B1 of the first solvent, and an IOB value C of the water soluble dye satisfy the following Equation (1), the IOB value B1 is 1.0 to 4.0, and a content of the first solvent exceeds 5.0 mass %.

$$A<B1<C \quad (1)$$

When a composite material (recording medium) in which two or more types of fibers are mixed is dyed, it is preferable to use a dye adapted for each of the fibers. In this case, a dyeing method is exemplified in which a plurality of heads accommodating two or more types of dye separately, for example, an ink composition containing a disperse dye and an ink composition containing a water soluble dye are used. However, in this case, since the number of the heads increases, there is a problem that the size and cost of a recording apparatus are increased.

Therefore, it is preferable to use an ink composition containing a disperse dye and a water soluble dye at the same time, from a viewpoint of the recording apparatus, and obtaining high quality recorded matter.

However, in the ink composition containing the disperse dye and the water soluble dye at the same time, there is a problem that a dispersion system of the disperse dye collapses and stability cannot be obtained. Further, use of a dispersant is considered from a viewpoint of stabilizing the dispersion system of the disperse dye. However, it is difficult to adjust a dynamic surface tension only by using the dispersant, and there is a tendency that the intermittent printing stability and the continuous printing stability are degraded.

With regard to this, since the ink composition of the embodiment has the above mentioned configuration, the ink composition has the excellent ink filterability, intermittent printing stability, and continuous printing stability, while maintaining the dispersion stability. In particular, since the ink composition includes a predetermined amount of the predetermined solvent, it is easy to adjust the dynamic surface tension, and the intermittent printing stability, and the continuous printing stability are further improved.

An "IOB value" is a value obtained by dividing an inorganic value (IV; Inorganic Value) by an organic value (OV; Organic Value) based on an organic conceptual diagram. The organic conceptual diagram is a diagram in which two organic (covalent) and inorganic (ion binding) factors are mapped on an orthogonal coordinate named as an organic axis and an inorganic axis, and is known as one of the indices predicting properties of organic compounds.

The IOB value (Inorganic/Organic Balance value, ratio of inorganic to organic) can be calculated based on a method disclosed on pages 66 to 70 of "Theoretical Chemistry of Dyeing" published by Maki Shoten and edited by KUROKI Nobuhiko (a numerical value is obtained based on a "calculation example" by using 3.3 Table "numerical value of inorganic group"). One carbon atom value is set to 20 for the organic value, one hydroxyl group value is set to 100 for the inorganic value, and the organic value and the inorganic value of other substitution groups are determined based on the above. In addition, in the specification, the HLB value is a value calculated by using the following Equation disclosed in "Synthesis of Surfactant and Application thereof" (ODA and TERAMURA, Maki Shoten (1957), page 501).

$$HLB \text{ value} = [(\Sigma \text{ inorganic value})/(\Sigma \text{ organic value})] \times 10$$

Disperse Dye

A disperse dye is a dye existing in a dispersed state in the ink composition without being dissolved.

An IOB value A of a disperse dye is smaller than an IOB value B1 of a first solvent described below. When this relationship is satisfied, the ink filterability, intermittent printing stability, and continuous printing stability are further improved.

The IOB value A is preferably 0.70 to 1.6, more preferably 0.80 to 1.5, and still more preferably 0.90 to 1.25. When the IOB value A is within the above ranges, there is a tendency that the dispersibility is further improved. In addition, in a case where a plurality of disperse dyes are contained, all the disperse dyes preferably satisfy the Equation (1) mentioned above.

The examples of the disperse dye which can be used in the embodiment are as follows.

A yellow disperse dye is not particularly limited, and for example, C.I. Dispers Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, 232, or the like can be exemplified.

An orange disperse dye is not particularly limited, and for example, C.I. Dispers Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, 142, or the like can be exemplified.

A magenta disperse dye is not particularly limited, and for example, C.I. Dispers Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 167:1, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, 328, or the like can be exemplified.

A violet disperse dye is not particularly limited, and, for example, C.I. Dispers Violet 1, 4, 8, 23, 26, 27, 28, 31, 33, 35, 36, 38, 40, 43, 46, 48, 50, 51, 52, 56, 57, 59, 61, 63, 69, 77, or the like can be exemplified.

A green disperse dye is not particularly limited, and, for example, C.I. Dispers Green 9, or the like can be exemplified.

A brown disperse dye is not particularly limited, and, for example, C.I. Dispers Brown 1, 2, 4, 9, 13, 19, or the like can be exemplified.

A blue disperse dye is not particularly limited, and, for example, C.I. Dispers Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, 360, or the like can be exemplified.

A black disperse dye is not particularly limited, and, for example, C.I. Dispers black 1, 3, 10, 24, or the like can be exemplified.

A content of the disperse dye is preferably 0.5 mass % to 10.0 mass % with respect to a total amount of the ink composition, preferably 1.0 mass % to 8.0 mass %, more preferably 1.5 mass % to 5.0 mass %. When the content of the disperse dye is 0.5 mass % or more, there is a tendency that color development is further improved. In addition, when the content of the disperse dye is 10.0 mass % or less, there is a tendency that foreign matter derived from a coagulation of the disperse dye, or foreign matter at a gas liquid interface is hardly generated.

First Solvent

An IOB value B1 of the first solvent is 1.0 to 4.0, preferably 1.1 to 3.5, and more preferably 1.3 to 2.8. When the IOB value B1 is within the above ranges, the dispersion stability of the disperse dye is further improved.

A difference between the IOB value B1 and the IOB A is preferably 0.30 to 2.2, more preferably 0.50 to 2.0, and still more preferably 0.70 to 1.80. When the difference between the IOB value B1 and the IOB value A is 2.2 or less, there is a tendency that the dispersion stability of the disperse dye is further improved. In addition, when the difference between the IOB value B1 and the IOB value A is 1.0 or less, there is a tendency that that printing stability (intermittent) is further improved.

The first solvent is not particularly limited, and for example, at least one selected from a group consisting of triethylene glycol(2.7), 1,4-butanediol(2.5), 1,5-pentanediol (2.0), 3-methyl-1,5-pentanediol(1.8), 1,2-hexanediol(1.7), 1,6-hexanediol(1.7), triethylene glycol monobutyl ether (1.4), and 2-pyrrolidone(1.8) can be exemplified. Among the above, triethylene glycol(2.7), 1,2-hexanediol(1.7), 1,6-hexanediol(1.7), and triethylene glycol monobutyl ether (1.4) are preferable. In addition, the value within the parenthesis indicates an IOB value.

A content of the first solvent exceeds 5.0 mass % with respect to a total amount of the ink composition, more preferably 10 mass % to 30 mass %, and still more preferably 10 mass % to 25 mass %. When the content of the first solvent exceeds 5.0 mass %, storage stability is further improved.

Second Solvent

The ink composition of the embodiment may further include a second solvent. An IOB value B2 of the second solvent preferably exceeds 4.0, and more preferably 5.0 or more. When this solvent is used, there is a tendency that the ink storage stability is further improved.

The second solvent is not particularly limited, and for example, at least one selected from a group consisting of ethylene glycol(5.0) and glycerin(5.0) can be exemplified. In addition, the value within the parenthesis indicates an IOB value.

A difference between the IOB value B1 and the IOB value B2 is preferably 1.5 to 4.0, more preferably 1.9 to 3.7, and still more preferably 2.1 to 3.5. When the difference between the IOB value B1 and the IOB value B2 is 1.5 or more, there is a tendency that solubility (stability) of the water soluble dye is further improved. In addition, when the difference between the IOB value B1 and the IOB value B2 is 2.0 or more, there is a tendency that the dispersibility of the disperse dye is further improved.

The content of the second solvent is 3.0 mass % to 10 mass % with respect to a total amount of the ink composition, more preferably 3.0 mass % to 8.0 mass %, and still more preferably 4.0 mass % to 7.0 mass %. When the content of the second solvent is within the range mentioned above, the ink storage properties are further improved.

Water Soluble Dye

A water soluble dye is a dye existing in a dissolved state in ink composition, which is a distinguishable point from the disperse dye. The water soluble dye is not particularly limited, and, for example, the following can be exemplified.

A yellow water soluble dye is not particularly limited, and, for example, reactive dyes such as C.I. Reactive Yellow 2, 3, 7, 13, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176; acidic dyes such as C.I. Acid Yellow 1, 3, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, 246, or the like can be exemplified.

A magenta water soluble dye is not particularly limited, and, for example, reactive dyes such as C.I. Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, 235; acidic dyes such as C.I. Acid Red 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, or the like can be exemplified.

A cyan water soluble dye is not particularly limited, and, for example, C.I. Direct Blue 87 can be exemplified.

An orange water soluble dye is not particularly limited, and, for example, reactive dyes such as C.I. Reactive Orange 1, 4, 5, 7, 11, 12, 13, 15, 16, 20, 30, 35, 56, 64, 67, 69, 70, 72, 74, 82, 84, 86, 87, 91, 92, 93, 95, 107; acidic dyes such as C.I. Acid Orange 3, 7, 8, 10, 19, 22, 24, 51, 51S, 56, 67, 74, 80, 86, 87, 88, 89, 95, 107, 108, 116, 122, 127, 140, 142, 144, 149, 152, 156, 162, 166, 168, or the like can be exemplified.

A blue water soluble dye is not particularly limited, and, for example, reactive dyes such as C.I. Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236, C.I. Reactive Violet 1, 2, 4, 5, 6, 22, 23, 33, 36, 38; acidic dyes such as C.I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, 350, C.I. Acid Vioret 17, 19, 21, 42, 43, 47, 48, 49, 54, 66, 78, 90, 97, 102, 109, 126, or the like can be exemplified.

The content of the water soluble dye is preferably 0.5 mass % to 10 mass % with respect to a total amount of the ink composition, more preferably 1.0 mass % to 6.0 mass %, and still more preferably 1.5 mass % to 5.0 mass %. When the content of the water soluble dye is 0.5 mass % or more, there is a tendency that the color development is further improved. In addition, when the content of the water soluble dye is 10.0 mass % or less, there is a tendency that storage properties are further improved. In addition, when a plurality of the water soluble dyes are contained, all the water soluble dyes preferably satisfy the Equation (1) mentioned above.

The IOB value C is preferably 4.0 to 6.0, more preferably 4.1 to 5.5, and still more preferably 4.3 to 5.2. When the IOB value C is within the above ranges, there is a tendency that the storage properties are further improved.

A difference between the IOB value C and the IOB value B2 (an absolute value of the difference (IOB value C–IOB value B2)) is preferably 1.0 to 0.10, more preferably 0.70 to 0, and still more preferably 0.60 to 0. When the difference between the IOB value C and the IOB value B is 1.0 or less, there is a tendency that solubility (ink storage properties) of the water soluble dye is further improved.

Dispersant

The dispersant is not particularly limited, and, for example, an anionic dispersant, a nonionic dispersant, and a polymeric dispersant can be exemplified. Among the above, the anionic dispersant is preferable. When the dispersant is used, there is a tendency that storage properties are further improved, and dyeing efficiency is improved more than in the case of using a fabric as a recording medium.

The anionic dispersant is not particularly limited, and, for example, a formalin condensate of an aromatic sulfonic acid can be exemplified.

The aromatic sulfonic acid is not particularly limited, and, for example, a benzene sulfonic acid compound such as creosote oil sulfonate, cresol sulfonic acid, phenol sulfonic acid, lignin sulfonic acid; alkyl naphthalene sulfonic acid such as β-naphthol sulfonic acid, β-naphthalene sulfonic acid, methyl naphthalene sulfonic acid, butyl naphthalene sulfonic acid; a naphthalene sulfonic acid compound such as a mixture of β-naphthalene sulfonic acid and β-naphthol sulfonic acid, a mixture of cresol sulfonic acid and 2-naphthol-6-sulfonic acid, or the like can be exemplified.

Among the above, it is preferable to include at least any one of the formalin condensate of the lignin sulfonic acid and the formalin condensate of the naphthalene sulfonic acid compound. When the dispersant is used, there is a tendency that storage properties are further improved.

The nonionic dispersant is not particularly limited, and, for example, an ethylene oxide adduct of phytosterol, an ethylene oxide adduct of cholestanol, or the like can be exemplified.

The polymeric dispersant is not particularly limited, and, for example, a partial alkyl ester of polyacrylic acid, polyalkylene polyamine, polyacrylate, a styrene-acrylic acid copolymer, a vinyl naphthalene-maleic acid copolymer, or the like can be exemplified.

A content of the dispersant is preferably 0.5 mass % to 5.0 mass % with respect to a total amount of the disperse dye included in the ink composition, more preferably 1.0 mass % to 4.0 mass %, and still more preferably 2.0 mass % to 4.0 mass %. When the content of the dispersant is within the range mentioned above, there is a tendency that the storage properties are further improved.

The IOB value D of the dispersant is preferably 5.0 to 6.0, more preferably 5.1 to 5.9, and still more preferably 5.3 to 5.7. When the IOB value D is within the above ranges, there is a tendency that the storage properties are further improved.

A difference between the IOB value D and the IOB value A is preferably 3.8 to 5.0, more preferably 4.0 to 4.8, and still more preferably 4.2 to 4.6.

A difference between the IOB value C and the IOB value D (an absolute value of the difference (IOB value C−IOB value D)) is preferably 2.0 to 0, more preferably 1.6 to 0, and still more preferably 1.0 to 0. When the difference between the IOB value C and the IOB value D is within the above ranges, there is a tendency that filtration of the ink is further improved.

Other Components

In the ink composition of the embodiment, various additives such as a dissolution aid, a viscosity modifier, a pH adjuster, an antioxidizing agent, a preservative, an antifungal agent, a corrosion inhibitor, a chelating agent for obtaining metal ions which affect dispersion, or the like can be added appropriately.

Recording Medium

A recording medium to which the ink composition of the embodiment can be applied is not particularly limited, and, for example, a fabric can be exemplified. The fabric is not particularly limited, and, for example, a fabric configured by only natural fibers such as silk, cotton, wool, and rayon, or synthetic fibers such as nylon, polyester, diacetate, triacetate, a fabric configured by mixing two or more types of the natural fibers, or mixing two or more types of the synthetic fibers, and a fabric configured by mixing at least one type of the natural fibers and at least one type of the synthetic fibers can be exemplified. Among the above, a fabric configured by mixing two or more types of the natural fibers, a fabric configured by mixing two or more types of the synthetic fibers, and a fabric configured by mixing at least one type of the natural fibers and at least one type of the synthetic fibers are preferable. The mixed fabric includes two or more types of fibers having different dyeing properties, and plural types of the ink composition are preferably used in order to obtain a high quality image. Therefore, the ink composition of the embodiment is particularly useful.

EXAMPLES

Hereinafter, Examples and Comparative Examples of the invention are described in detail. The invention is not limited to the following Examples at all.

Materials for Ink Composition

Main materials for the ink composition used in the following Examples and Comparative Examples are as follows.

Disperse Dye
Y114 (C.I. Dispers Yellow 114)
B165 (C.I. Dispers Blue 165)
R167:1 (C.I. Dispers Red 167:1)
Solvent
Solvent 1 (triethylene glycol monobutyl ether, IOB value: 1.40)
Solvent 2 (1,2-hexanediol, IOB value: 1.70)
Solvent 3 (triethylene glycol, IOB value: 2.70)
Solvent 4 (glycerin, IOB value: 5.00)
Water Soluble Dye
Y2 (C.I. Reactive Yellow 2)
Y13 (C.I. Reactive Yellow 13)
B49 (C.I. Reactive Blue 49)
R24 (C.I. Reactive Red 24)
Dispersant
Dispersant 1: refer to the following (Ph=phenyl group)
Dispersant 2: refer to the following
Dispersant 1:

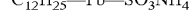

$C_{12}H_{25}$—Ph—$SO_3NH_4$

Dispersant 2:

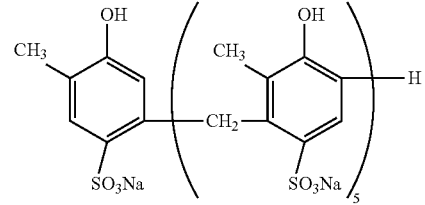

pH Adjuster
Triethanolamine
Surfactant
BYK 348 (silicone-based surfactant, manufactured by BYK)
Preparation of Ink Composition Each of the materials were mixed according to a composition shown in Table described below, and stirred sufficiently, thereby obtaining each ink composition. In addition, a unit of the numerical value in the Table described below is mass %, and a sum of the values is 100.0 mass %.

TABLE

| | | Example 1 | Example 2 | Example 3 | Example 4 | Example 5 | Comparative Example 1 | Comparative Example 2 |
|---|---|---|---|---|---|---|---|---|
| Disperse dye | Type | Y114 | B165 | R167:1 | Y114 | R167:1 | B165 | Y114 |
| | IOB value A | 1.24 | 0.93 | 0.93 | 1.24 | 0.93 | 0.93 | 1.24 |
| | Content | 2.00 | 4.00 | 4.00 | 2.00 | 4.00 | 4.00 | 2.00 |
| First solvent | Type | 1 | 3 | 2 | 3 | 2 | — | — |
| | IOB value B1 | 1.40 | 2.70 | 1.70 | 2.70 | 1.70 | — | — |
| | Content | 10.00 | 25.00 | 10.00 | 10.00 | 5.50 | — | — |
| Second solvent | Type | 4 | 4 | 4 | — | 4 | — | — |
| | IOB value B2 | 5.00 | 5.00 | 5.00 | — | 5.00 | 5.00 | — |
| | Content | 5.00 | 5.00 | 5.00 | 0.00 | 5.00 | 25.00 | 0.00 |
| Water soluble dye | Type | Y2 | B49 | R24 | Y2 | R24 | B49 | Y13 |
| | IOB value C | 4.70 | 4.40 | 5.10 | 4.70 | 5.10 | 4.40 | 5.60 |
| | Content | 2.00 | 4.00 | 4.00 | 2.00 | 4.00 | 4.00 | 2.00 |
| Dispersant | Type | 2 | 2 | 2 | 2 | 2 | 2 | 1 |
| | IOB value D | 5.50 | 5.50 | 5.50 | 5.50 | 5.50 | 5.50 | 1.85 |
| | Content | 2.00 | 4.00 | 4.00 | 2.00 | 4.00 | 4.00 | 2.00 |
| pH adjuster | Triethanolamine | 0.50 | 0.50 | 0.50 | 0.50 | 0.50 | 0.50 | 0.50 |
| Surfactant | BYK348 | 0.50 | 0.50 | 0.50 | 0.50 | 0.50 | 0.50 | 0.50 |
| Water | | residue | residue | residue | residue | residue | residue | residue |
| IOB value D - IOB value A | | 4.26 | 4.57 | 4.57 | 4.26 | 4.57 | 4.57 | 0.61 |

TABLE-continued

|  | Example 1 | Example 2 | Example 3 | Example 4 | Example 5 | Comparative Example 1 | Comparative Example 2 |
|---|---|---|---|---|---|---|---|
| Absolute value of IOB value C – IOB value D | 0.80 | 1.10 | 0.40 | 0.80 | 0.40 | 1.10 | 3.75 |
| IOB value B1 – IOB value A | 0.16 | 1.77 | 0.77 | 1.46 | 0.77 | — | — |
| IOB value B2 – IOB value B1 | 3.60 | 2.30 | 3.30 | — | 3.30 | — | — |
| Absolute value of IOB value C – IOB value B2 | 0.30 | 0.60 | 0.10 | — | 0.10 | 0.60 | — |
| Ink filterability | A | A | A | A | A | C | C |
| Intermittent printing stability | A | B | A | B | A | A | C |
| Continuous printing stability | A | A | A | A | B | C | C |

Ink Filterability

The ink materials were mixed, stirred, and suction-filtrated with a membrane filter of 10 μm (Merck Millipore Corporation, Omnipore Filter, type number JCWP). The ink filterability was evaluated according to the evaluation criteria described below.

Evaluation Criteria

A: Filtration is possible.
B: Filtration is impossible.

Intermittent Printing Stability

After a head filled with the ink was made to idle for 3 seconds in an environment of 40° C., the number of nozzle omissions was counted at the time of discharging the ink. The intermittent printing stability was evaluated according to the evaluation criteria described below.

Evaluation Criteria

A: No nozzle omission
B: Less than 20% of nozzle omission
C: 20% or more of nozzle omission Continuous Printing Stability Each of the ink compositions was adhered to a photo paper (trade name, Photo Paper <Glossy>) at room temperature by using a printer of Seiko Epson Corp. (trade name PX-G930) to form a solid pattern at a resolution of 720 dpi×720 dpi. In the same manner, after 20 pieces of paper were continuously printed, dot omission was visually observed, and a ratio of the dot omission was calculated to evaluate the continuous printing stability according to the evaluation criteria described below.

Evaluation Criteria

A: No nozzle omission
B: Less than 20% of nozzle omission
C: 20% or more of nozzle omission The entire disclosure of Japanese Patent Application No. 2014-187766, filed Sep. 16, 2014 is expressly incorporated by reference herein.

What is claimed is:

1. A printing ink composition comprising:
    a disperse dye;
    a first solvent;
    a water soluble dye; and
    a dispersant, and
    wherein an IOB value A of the disperse dye, an IOB value B1 of the first solvent, and an IOB value C of the water soluble dye satisfy the following Equation (1), $$A < B1 < C \qquad (1),$$

the IOB value B1 is 1.0 to 4.0, and
    a content of the first solvent exceeds 5.0 mass %,
    wherein the first solvent includes at least one selected from a group consisting of 1,4-butanediol, 1,5-heptanediol, 3-methyl-1,5-heptanediol, 1,2-hexanediol, 1,6-hexanediol, and 2-pyrrolidone.

2. The printing ink composition according to claim 1, wherein a content of the first solvent is 10 mass % to 30 mass %.

3. The printing ink composition according to claim 1, further comprising:
    a second solvent,
    wherein an IOB value B2 of the second solvent is 5.0 or more.

4. The printing ink composition according to claim 3, wherein a content of the second solvent is 3.0 mass % to 10 mass %.

5. The printing ink composition according to claim 1, wherein the dispersant includes at least any one of a formalin condensate of a lignin sulfonic acid and a formalin condensate of a naphthalene sulfonic acid compound.

6. The printing ink composition according to claim 1, wherein the IOB value C is 4.0 to 6.0.

7. The printing ink composition according to claim 1, wherein the IOB value A is 0.80 to 1.5.

* * * * *